United States Patent
Rodrigues et al.

(10) Patent No.: US 11,946,814 B2
(45) Date of Patent: Apr. 2, 2024

(54) WINDOW-BASED TEMPERATURE DETERMINATION AND/OR DISPLAY

(71) Applicant: Toyota Motor Engineering & Manufacturing North America, Inc., Plano, TX (US)

(72) Inventors: Sean P. Rodrigues, Ann Arbor, MI (US); Ercan Mehmet Dede, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 223 days.

(21) Appl. No.: 17/343,824

(22) Filed: Jun. 10, 2021

(65) Prior Publication Data
US 2022/0397464 A1   Dec. 15, 2022

(51) Int. Cl.
*G01K 11/3206*  (2021.01)
*G01K 1/02*  (2021.01)
(Continued)

(52) U.S. Cl.
CPC ............ *G01K 11/3206* (2013.01); *G01K 1/02* (2013.01); *G02B 5/18* (2013.01); *E06B 3/66* (2013.01); *E06B 9/24* (2013.01); *E06B 2009/2405* (2013.01); *E06B 2009/2417* (2013.01); *E06B 2009/2464* (2013.01); *E06B 2009/247* (2013.01); *G01K 1/028* (2013.01); *G02B 2005/1804* (2013.01); *G02B 6/0063* (2013.01); *G02B 6/0068* (2013.01); *G02B 6/0095* (2013.01); *G02B 6/02204* (2013.01);
(Continued)

(58) Field of Classification Search
CPC ...... G01K 11/3206; G01K 1/02; G01K 1/028; G02B 5/18; G02B 6/0063; G02B 6/0068; G02B 6/0095; G02B 6/02204; G02B 2005/1804; G02B 2006/12138; E06B 3/66; E06B 9/24; E06B 2009/2405; E06B 2009/2417; E06B 2009/2464; E06B 2009/247; G02F 1/133342; G02F 1/133504
See application file for complete search history.

(56) References Cited

U.S. PATENT DOCUMENTS 5,399,854 A * 3/1995 Dunphy ................... G01K 5/72
374/E11.016
5,953,469 A * 9/1999 Zhou ..................... G02B 6/3522
385/22

(Continued)

OTHER PUBLICATIONS

Zhou, X. et al., "Full color waveguide liquid crystal display," Optics Letters, vol. 42, No. 18 (Sep. 15, 2017) pp. 3706-3709 (4 pages).
(Continued)

*Primary Examiner* — Nathaniel T Woodward
*Assistant Examiner* — Philip L Cotey
(74) *Attorney, Agent, or Firm* — Christopher G. Darrow; Darrow Mustafa PC

(57) ABSTRACT

A window can comprise a first side and a second side substantially parallel to the first side. The window can comprise an optical grating operatively positioned with respect to one of the first side and the second side. The optical grating can be used to determine a temperature at or near the respective one of the first side and the second side.

20 Claims, 10 Drawing Sheets

(51) Int. Cl.
*G02B 5/18* (2006.01)
*E06B 3/66* (2006.01)
*E06B 9/24* (2006.01)
*F21V 8/00* (2006.01)
*G02B 6/02* (2006.01)
*G02B 6/12* (2006.01)
*G02F 1/1333* (2006.01)
*G02F 1/1335* (2006.01)

(52) U.S. Cl.
CPC .............. *G02B 2006/12138* (2013.01); *G02F 1/133342* (2021.01); *G02F 1/133504* (2013.01)

(56) References Cited

U.S. PATENT DOCUMENTS

| | | | |
|---|---|---|---|
| 7,542,635 B2* | 6/2009 | Coleman | G02B 6/0041 |
| | | | 362/617 |
| 8,290,315 B2* | 10/2012 | Saunders | G01K 1/20 |
| | | | 29/709 |
| 8,362,992 B2* | 1/2013 | Kuhlman | G02F 1/13306 |
| | | | 345/204 |
| 8,964,298 B2* | 2/2015 | Haddick | G02B 27/017 |
| | | | 359/630 |
| 10,632,820 B2* | 4/2020 | Cosgrove | B60H 1/3208 |
| 11,320,588 B1* | 5/2022 | Mazed | G16H 10/40 |
| 11,327,305 B2* | 5/2022 | Haussler | H04N 9/3185 |
| 11,359,841 B2* | 6/2022 | Raman | B32B 18/00 |
| 2003/0076487 A1* | 4/2003 | Cannon | G01N 33/386 |
| | | | 356/33 |
| 2005/0115308 A1* | 6/2005 | Koram | B32B 17/10174 |
| | | | 73/73 |
| 2006/0272397 A1* | 12/2006 | Hawk | B60S 1/0822 |
| | | | 73/73 |
| 2010/0247027 A1* | 9/2010 | Xia | G01D 5/35303 |
| | | | 385/12 |
| 2013/0127980 A1* | 5/2013 | Haddick | G06F 3/013 |
| | | | 348/14.08 |
| 2014/0369641 A1* | 12/2014 | Chiang | G01K 1/14 |
| | | | 385/12 |
| 2019/0356508 A1* | 11/2019 | Trikha | H03H 7/48 |
| 2021/0011300 A1* | 1/2021 | Leister | G02B 5/3016 |
| 2021/0033857 A1* | 2/2021 | Waldern | G02B 6/005 |
| 2021/0055548 A1* | 2/2021 | Rao | G09G 3/3426 |
| 2021/0165215 A1* | 6/2021 | Haussler | G02B 27/0101 |
| 2021/0341314 A1* | 11/2021 | Desmarchelier | G02B 6/02395 |
| 2021/0389615 A1* | 12/2021 | Rodrigues | G02F 1/137 |
| 2022/0187521 A1* | 6/2022 | Toy | G02B 27/0101 |
| 2022/0283377 A1* | 9/2022 | Popovich | G02B 6/0016 |
| 2022/0382224 A1* | 12/2022 | Shrivastava | G02F 1/163 |

OTHER PUBLICATIONS

Moynihan, T., "What Are Quantum Dots, and Why Do I Want Them in My TV?," https://www.wired.com/2015/01/primer-quantum-dot/ (2015) (8 pages).

Klimov, N. et al., "On-chip silicon waveguide Bragg grating photonic temperature sensor," Optics Letters, vol. 40, Issue 17 (2015) (4 pages).

Li, Understanding Waveguide: the Key Technology for Augmented Reality Near-eye Display (Part 1), Retrieved from <https://virtualrealitypop.com/understanding-waveguide-the-key-technology-for-augmented reality-near-eye-display-part-i-2b16b61f4bae>, Published Jun. 18, 2019, pp. 1-10 (10 pages).

Rodrigues et al., U.S. Appl. No. 17/536,821, filed Nov. 29, 2021.
Rodrigues et al., U.S. Appl. No. 17/536,753, filed Nov. 29, 2021.

* cited by examiner

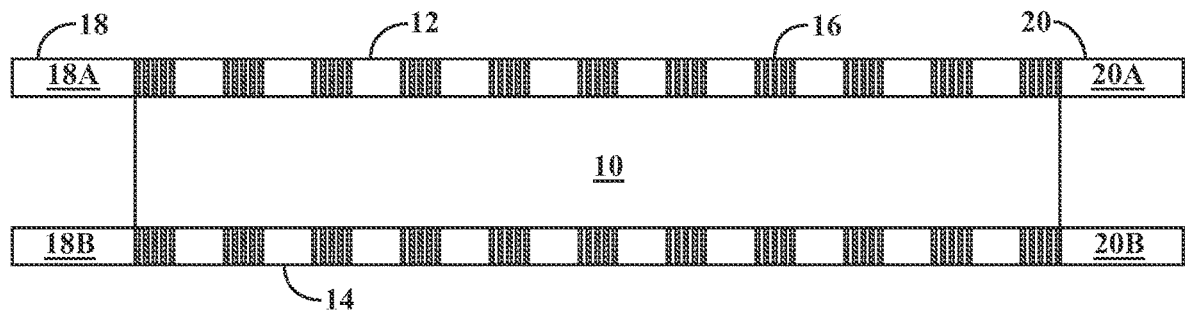
FIG. 2A
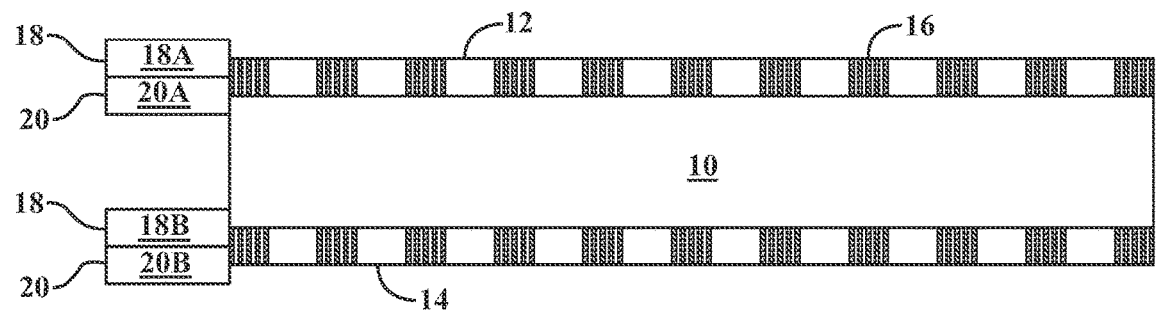
FIG. 2B
FIG. 3
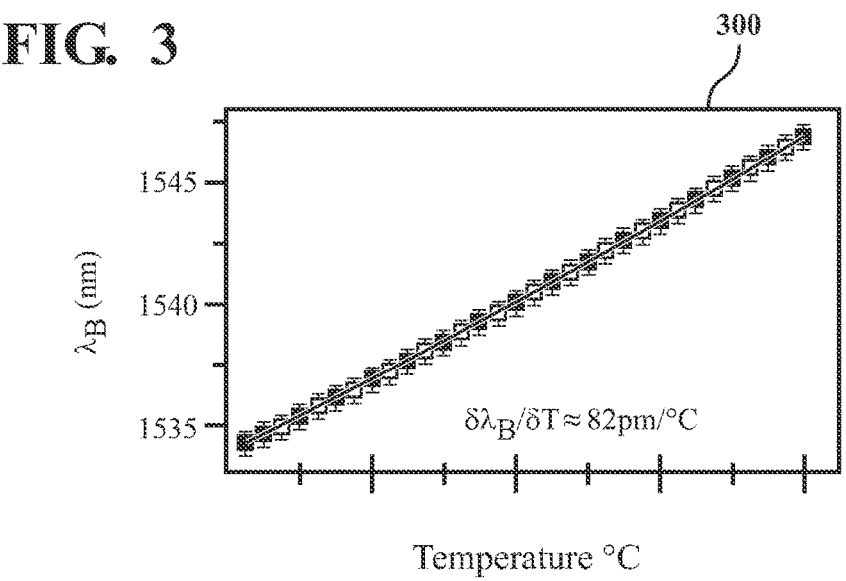

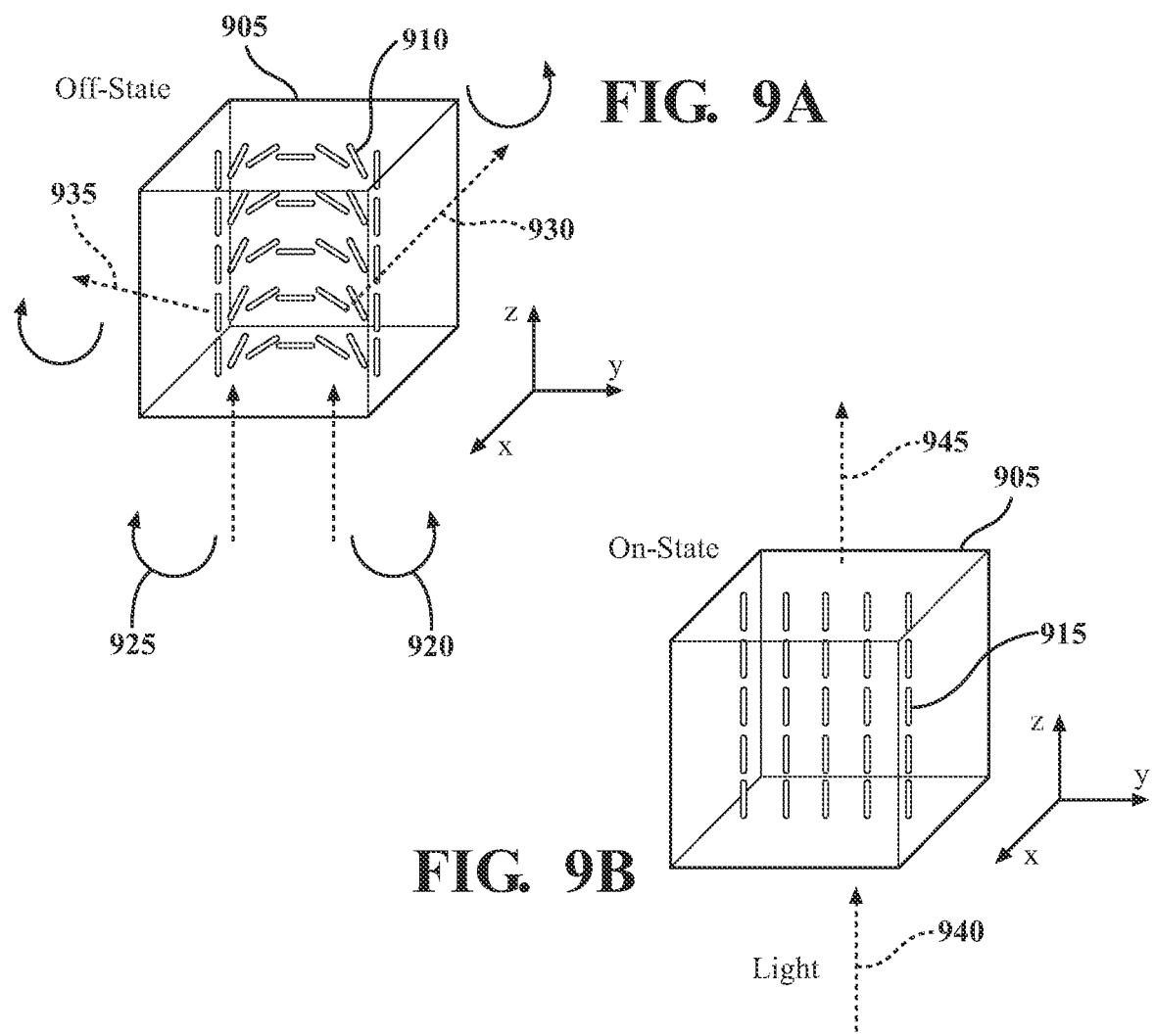
FIG. 9A
FIG. 9B
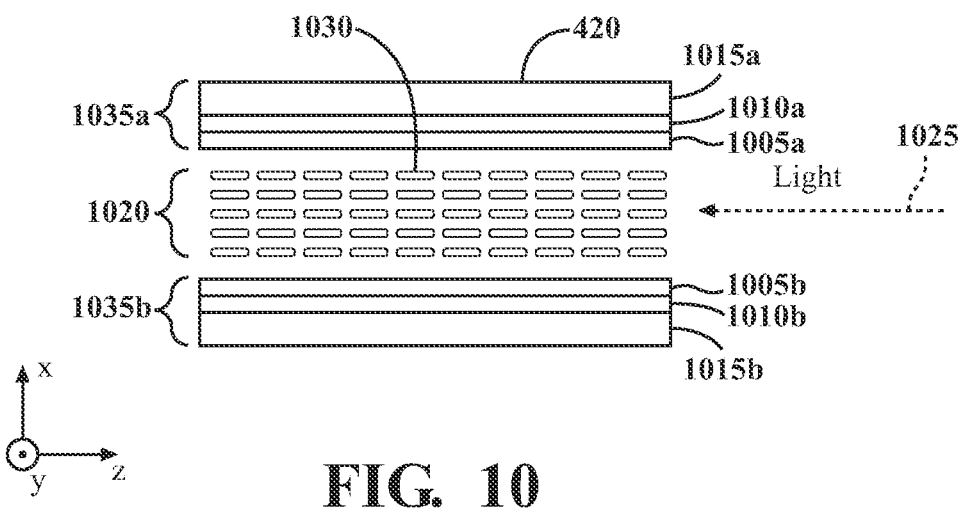
FIG. 10

WINDOW-BASED TEMPERATURE DETERMINATION AND/OR DISPLAY

FIELD

The subject matter described herein relates in general to temperature determination and, more particularly, to determining temperature using a window and/or displaying the temperature with an embedded window display.

BACKGROUND

Various structures, including vehicles and buildings, can include various systems or components for determining a temperature inside and/or outside of the structure. For example, vehicles can include a temperature sensor located on the vehicle to measure the temperature of the external environment of the vehicle. In another example, buildings can include a thermostat for measuring the temperature inside the building.

SUMMARY

In one respect, the present disclosure is directed to a window. The window can include a first side and a second side substantially parallel to the first side. The window can include an optical grating operatively positioned with respect to one of the first side and the second side. The optical grating can be used to determine a temperature at or near the respective one of the first side and the second side.

In another respect, the present disclosure is directed to a window system. The window system can include a structure having a window. The window can have a first side and a second side substantially parallel to the first side. The window system can include an optical grating operatively positioned with respect to one of the first side and the second side. The optical grating can be used to determine a temperature at or near the respective first side or second side. The window system can include a light source operatively positioned with respect to one of the first side and the second side. The light source can be configured to emit light toward the optical grating. The window system can include a detector operatively positioned to detect one or more wavelengths of the light after it has interacted with the optical grating. The window system can include a processor operatively connected to the optical grating. The processor can be configured to determine, using wavelength-temperature dependence data, a temperature at or near the respective one of the first side and the second side based on the detected one or more wavelengths.

In yet another respect, the present disclosure is directed to a method for determining a temperature at or near one of a first side and a second side of a window. The method can include determining, using an optical grating operatively positioned with respect to at least one of the first side and the second side, the temperature at or near at least one of the first side and the second side.

BRIEF DESCRIPTION OF THE DRAWINGS

FIG. 2A is a first example of a window.

FIG. 2B is a second example of a window.

FIG. 3 is an example of a Bragg wavelength-temperature graph.

FIGS. 9A and 9B are various aspects of a third embodiment of a dual-sided transparent display that can be used in connection with the window-based temperature determination system.

FIG. 10 is an example of the third embodiment of a dual-sided transparent display that can be used in connection with the window-based temperature determination system.

DETAILED DESCRIPTION

Figure 1:
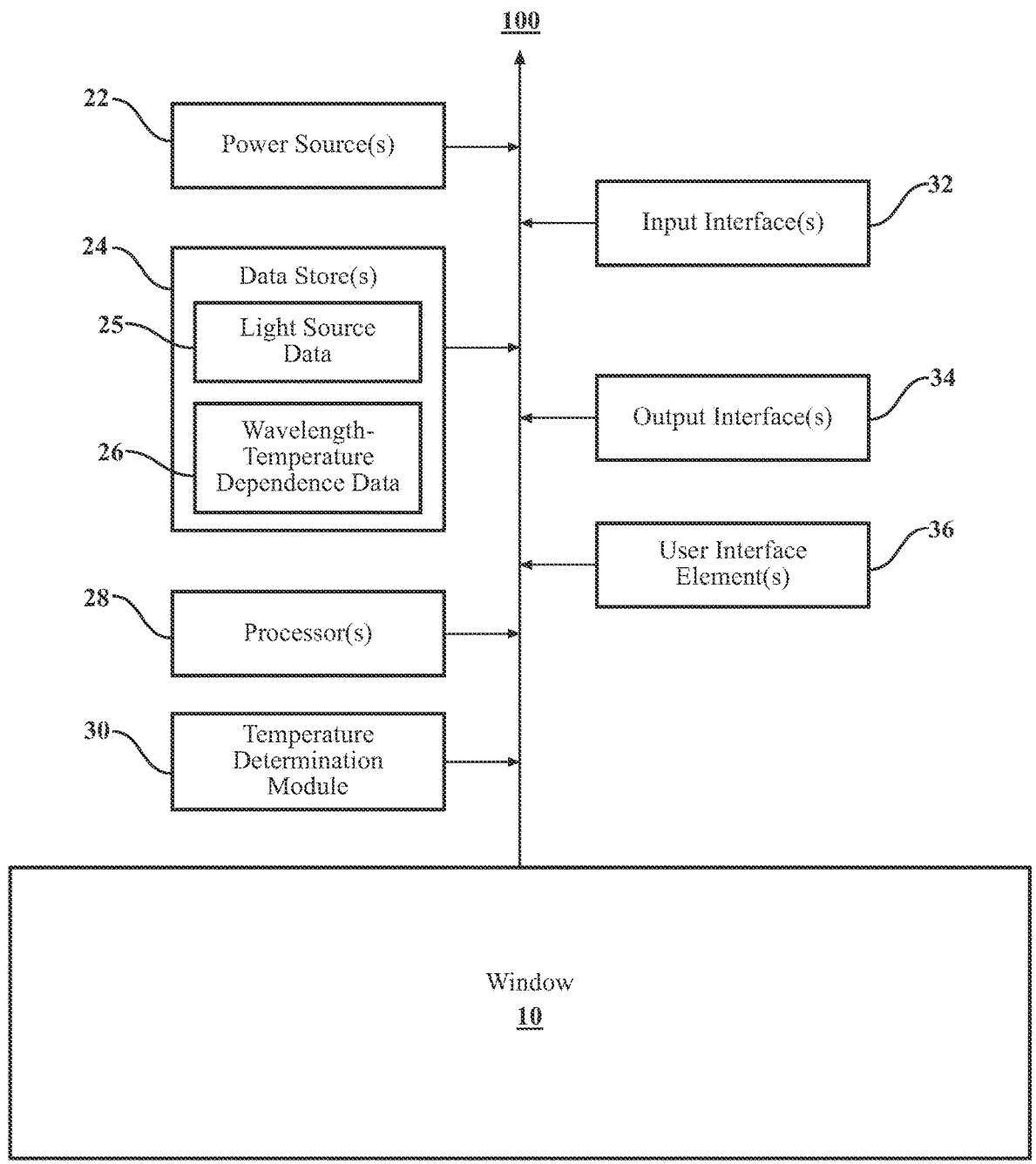
FIG. 1 is an example of a window-based temperature determination system.

A structure such as a vehicle or a building can include a window-based temperature determination system for determining a temperature inside and/or outside of the structure. The system can include a window having an optical grating that can be used to determine a temperature at or near a first side and/or a second side of the window. By detecting one or more wavelengths of light after it has interacted with the optical grating, the system can determine a temperature at or near at the first side and/or the second side of the window. The system can also be configured to display the temperature to a person near the window.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a window-based temperature determination system is shown. The system 100 can include various components for determining a temperature at or near at least one side of a window. As shown in FIG. 1, the system 100 can include a window 10, one or more power sources 22, one or more data stores 24 that can be used to store light source data 25 and/or wavelength-temperature dependence data 26, one or more processors 28, a temperature determination module 30, one or more input interfaces 32, one or more output interfaces 34, and one or more user interface elements 36.

It will be understood that it is not necessary for the system 100 to have all of the elements shown in FIG. 1 or described herein. The system 100 can have any combination of the various elements shown in FIG. 1. Further, the system 100 can have additional elements to those shown in FIG. 1. In some arrangements, the system 100 may not include one or more of the elements shown in FIG. 1. Further, the elements shown may be physically separated by large distances. Each of the elements of FIG. 1 will now be described in further detail.

The various elements of the system 100 can be communicatively linked to one another or one or more other element(s) through one or more communication networks. The term "communicatively linked," as used herein, can include direct or indirect connections through a communication channel, bus, pathway, or another component or system. The term "communication network," as used herein, means one or more components designed to transmit and/or receive information from one source to another. The elements of the system can include and/or execute suitable communication software, which enable the various elements to communicate with each other through the communication network and perform the functions disclosed herein.

The communication network(s) can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network(s) can be implemented as or include one or more wireless networks, whether short range (e.g., a local wireless network built using a Bluetooth or one of the IEEE 802 wireless communication protocols, e.g., 802.11 a/b/g/I, 802.15, 802.16, 802.20, Wi-Fi Protected Access (WPA or WPA2) or long range (e.g., a mobile, cellular, and/or satellite-based wireless network; GSM, TDMA, CDMA, WCDMA networks, or the like). The communication network(s) can include wired communication links and/or wireless communication links. The communication network(s) can include any combination of the above networks and/or other types of networks.

As noted above, the system 100 can include a window 10. Referring to FIGS. 2A and 2B, some examples of the window 10 are shown. The window 10 can include a first side 12 and a second side 14. The second side 14 can be substantially parallel to the first side 12. The first side 12 and/or the second side 14 can include a surface of the window 10, for example, a surface of a glass pane. Alternatively, the first side 12 and/or the second side 14 can be separate window components, for example, separate glass panes. In such arrangements, the panes can be separated by a noble gas (e.g. argon or krypton) compartment (or layer) with an appropriate edge seal to the panes. The window 10 can be made of any suitable material, now known or later developed. The window 10 can have any suitable size, shape, and/or configuration. The window 10 can include one or more layers.

The window 10 can include one or more optical gratings 16. The optical grating(s) 16 can be operatively positioned with respect to the first side 12 and/or the second side 14. As shown in FIGS. 2A and 2B, the window 10 includes a plurality of optical gratings 16 operatively positioned with respect to both the first side 12 and the second side 14. As used herein, the term "operatively positioned" means on, in, or under the respective surface of the window such that a temperature of the environment on that side of the window can affect the wavelength of light passing through the optical grating.

There can be any suitable quantity of optical gratings 16. In some instances, the quantity of the optical grating(s) 16 on the first side 12 can be the same as the quantity of the optical grating(s) 16 on the second side 14. In other instances, the quantity of the optical grating(s) 16 on the first side 12 can be different than the quantity of the optical grating(s) 16 on the second side 14. In some arrangements, the size, arrangement, and distribution of the optical grating(s) 16 on the first side 12 can be the same as the size, arrangement, and distribution of the optical grating(s) 16 on the second side 14. In some arrangements, the size, arrangement, and/or distribution of the optical grating(s) 16 on the first side 12 can be different from the size, arrangement, and/or distribution of the optical grating(s) 16 on the second side 14. In some arrangements, the optical grating(s) 16 on the first side 12 can be substantially aligned with the optical grating(s) 16 on the second side 14. In some arrangements, the optical grating(s) 16 on the first side 12 may not be aligned with the optical grating(s) 16 on the second side 14 such that they do not overlap in a direction that passes through and is substantially perpendicular to the first side 12 and the second side 14.

The optical grating(s) 16 can be configured to interact with light such that one or more optical characteristics of the light are changed. For instance, the optical grating(s) 16 can be configured to filter or remove one or more wavelengths of the light. The optical grating(s) 16 can be any suitable type of optical grating.

For example, the optical grating(s) 16 can also be configured as a notch band reject grating or a notch band pass grating. The notch band reject grating (e.g., notch filter) can be configured to reflect or filter a small segment of light (e.g., one wavelength or a subset of wavelengths) while allowing the remaining light to pass through the grating. The notch band pass grating (e.g., notch pass) can be configured to allow a small segment of light (e.g., one wavelength or a subset of wavelengths) to pass through the grating while reflecting or filtering the remaining light.

The optical grating(s) 16 can be any suitable form of optical grating(s). For example, one or more of the optical grating(s) 16 can be an optical fiber grating, an optical splitter, a Bragg grating, a fiber Bragg grating, a diffraction grating, a fiber optic wavelength decoder, a ruled grating, a holographic grating, and/or any other optical component with a periodic structure that can diffract or split light energy into one or more its constituent wavelengths such that at least some of these wavelengths are directed at a different angle. In some arrangements, the optical grating(s) 16 can be applied with a light sensitive characteristic of fiber core layer material so that a refractive index on the grating changes where the wavelength and temperature of the optical grating have excellent linear relationships.

The optical grating(s) 16 can be formed on a surface of the window 10, coated on a surface of the window 10, or otherwise formed or integrated into the window 10, for example, below a surface of the window 10. In some arrangements, the optical grating(s) 16 can be formed in the window 10 by etching or cutting gratings onto a surface of the window 10. In other arrangements, the optical grating(s) 16 can be coated on the window 10 by applying grating(s) to a surface of the window 10.

In addition to the optical grating(s) 16, the window 10 can include one or more light sources 18, as noted above. The light source(s) 18 can be operatively positioned with respect to the first side 12 and/or the second side 14. As shown in FIGS. 2A and 2B, the window 10 includes a first light source 18A operatively positioned with respect to the first side 12 and a second light source 18B operatively positioned with respect to the second side 14. In these and other arrangements, the light source(s) 18 can be configured to emit light toward the optical grating(s) 16 such that the light interacts with the optical grating(s) 16. The light source(s) 18 can be configured to emit any suitable type of light. For example, the light source(s) 18 can emit polychromatic, visible light, or a set of laser diodes with a full-width half max greater than 5 nanometers. In some arrangements, the light source(s) 18 can be wideband light source transmitters.

In addition to the light source(s) 18, the window 10 can include one or more detectors 20, as noted above. The detector(s) 20 can be operatively positioned to detect one or more properties of the light after the light has interacted with the optical grating(s) 16. For example, the detector(s) 20 can be configured to detect one or more wavelengths of the light after the light has interacted with the optical grating(s) 16. The detector(s) 20 can be any suitable type of detector(s). For example, the detector(s) 20 can be spectrometer(s) or detector(s) having multiple spectral filters.

In the arrangements shown in FIG. 2A, the detector(s) 20 can be positioned on the opposite side of the optical grating(s) 16 from the light source(s) 18. In these arrangements, the detector(s) 20 can be operatively positioned and configured to detect the wavelength(s) of the light after the light has passed through the optical gratings. Also shown, the detector(s) 20 can include a first detector 20A operatively positioned with respect to the first side 12 on the opposite side of the optical grating(s) 16 from the first light source 18A. The first detector 20A can detect the wavelength(s) of the light emitted by the first light source 18A after it has passed through the optical grating(s) 16 on the first side 12 of the window 10. Similarly, the detector(s) 20 can also include a second detector 20B operatively positioned with respect to the second side 14 on the opposite side of the optical grating(s) from the second light source 18B. The second detector 20B can detect the wavelength(s) of the light emitted by the second light source 18B after it has passed through the optical grating(s) 16 on the second side 14. In some arrangements, the first detector 20A can be substantially aligned with the first light source 18A and/or the second detector 20B can be substantially aligned with the second light source 18B.

In the arrangements) shown in FIG. 2B, the detector(s) 20 can be positioned on the same side of the optical grating(s) 16 as the light source(s) 18. In these arrangements, the detector(s) 20 can be operatively positioned and configured to detect the wavelength(s) of the light after the light has been reflected by the optical grating(s) 16. In these arrangements, the detector(s) 20 can include a first detector 20A operatively positioned with respect to the first side 12 on the same side of the optical grating(s) 16 as the first light source 18A. The first detector 20A can detect the wavelength(s) of the light emitted by the first light source 18A after it has been reflected by the optical grating(s) 16 on the first side 12 of the window 10. Similarly, the detector(s) 20 can also include a second detector 20B operatively positioned with respect to the second side 14 on the same side of the optical grating(s) as the second light source 18B. The second detector 20B can detect the wavelength(s) of the light emitted by the second light source 18B after it has been reflected by the optical grating(s) 16 on the second side 14. In some arrangements, the first detector 20A can be substantially adjacent to the first light source 18A and/or the second detector 20B can be substantially adjacent to the second light source 18B.

There can be various arrangements of the optical grating(s) 16, the light source(s) 18 and the detector(s) 20. Some of these arrangements are shown in connection with FIGS. 11A-11D. It should be noted that, in these examples, the terms "input signal" and "output signal" are used for convenience to facilitate the discussion and are used relative to the signal before and after interacting with the optical grating(s) 16, respectively.

Figure 11A:
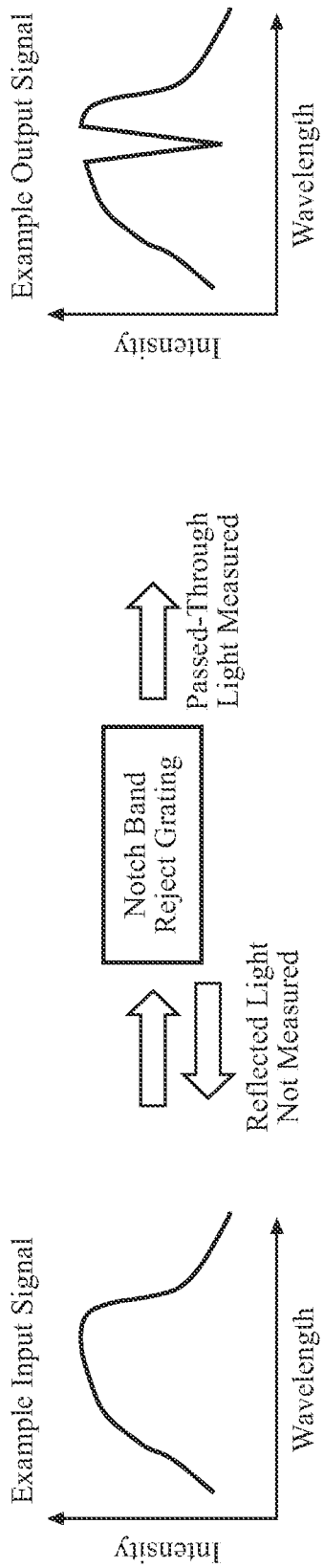
FIG. 11A is an example of an arrangement of a notch band reject grating, a light source, and a detector.

As shown in FIG. 11A, the optical grating(s) 16 can be notch band reject grating(s). The light source(s) 18 can emit an example input signal (e.g., emit light toward the notch band reject grating(s)). The notch band reject grating(s) can be configured to reflect one or a small subset of wavelengths of light and allow the remaining wavelengths to pass through the grating(s). In this example, the detector(s) 20 can be positioned on the opposite side of the grating(s) from the light source(s) 18. The detector(s) 20 can be configured to capture an output signal (light that has passed through the grating(s)). As shown in FIG. 11A, the example output signal can generally have the same shape as the example input signal, but a segment of the signal is missing, which is evident by the v-shaped dip in the example output signal. In these arrangements, the reflected light may not be measured.

Figure 11B:
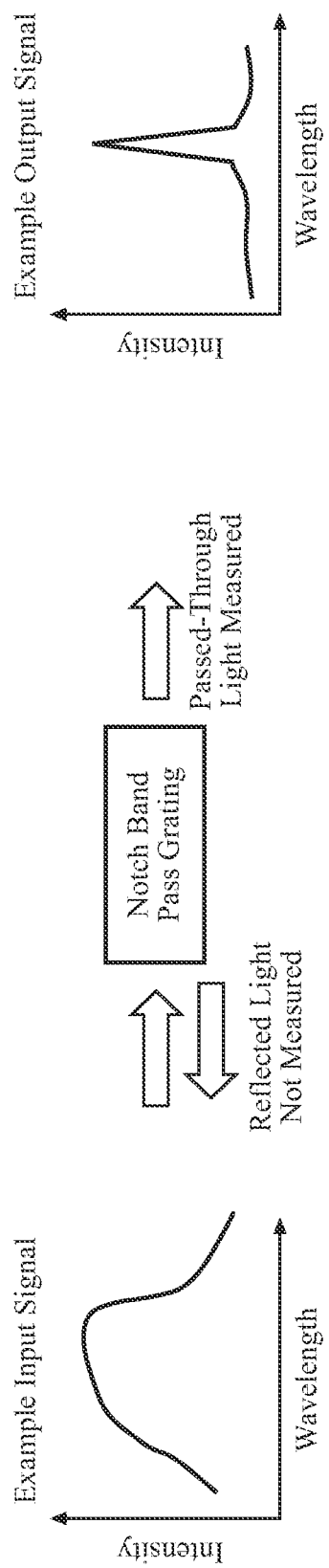
FIG. 11B is an example of an arrangement of a notch band pass grating, a light source, and a detector.

Referring to FIG. 11B, the optical grating(s) 16 can be notch band pass grating(s). The light source(s) 18 can emit an example input signal (e.g., emit light toward the notch band pass grating(s)). The notch band pass grating(s) can be configured to allow only one or a small subset of wavelengths of light to pass through the grating(s) and reflect the remaining wavelengths. The detector(s) 20 can be positioned on the opposite side of the grating(s) from the light source(s) 18. The detector(s) 20 can be configured to capture an output signal (light that has passed through the grating(s)). As shown in FIG. 11B, only the small segment of light that was allowed to pass appears in the example output signal, which is evident by the spike in the example output signal. In these arrangements, the reflected light may not be measured.

Figure 11C:
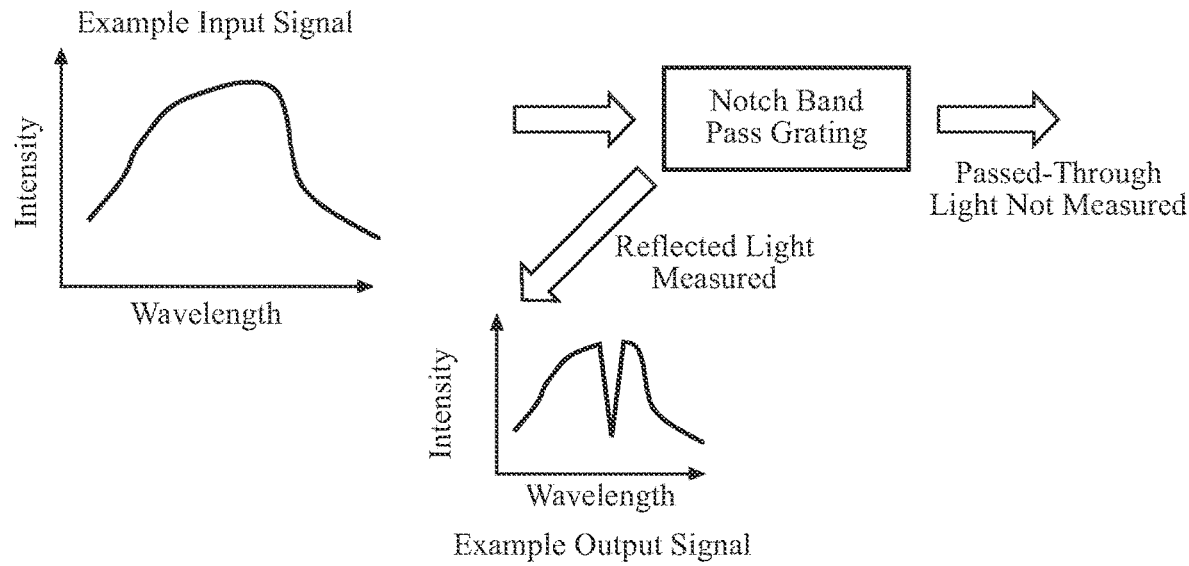
FIG. 11C is an example of an arrangement of a notch band reject grating, a light source, and a detector.

As shown in FIG. 11C, the optical grating(s) 16 can be notch band pass grating(s). The light source(s) 18 can emit an example input signal (e.g., emit light toward the notch band pass grating(s)). The notch band pass grating(s) can be configured to allow one or a small subset of wavelengths of light to pass through the grating(s) while reflecting the remaining wavelengths of the input signal. The detector(s) 20 can be positioned on the same side of the grating(s) as the light source(s) 18. The detector(s) 20 can be configured to capture an output signal (light reflected by the grating(s)). As shown in FIG. 11C, the example output signal can generally have the same shape as the example input signal, but a small segment of the signal is missing, which is evident by the v-shaped dip in the example output signal. In these arrangements, the passed-through light may not be measured.

Figure 11D:
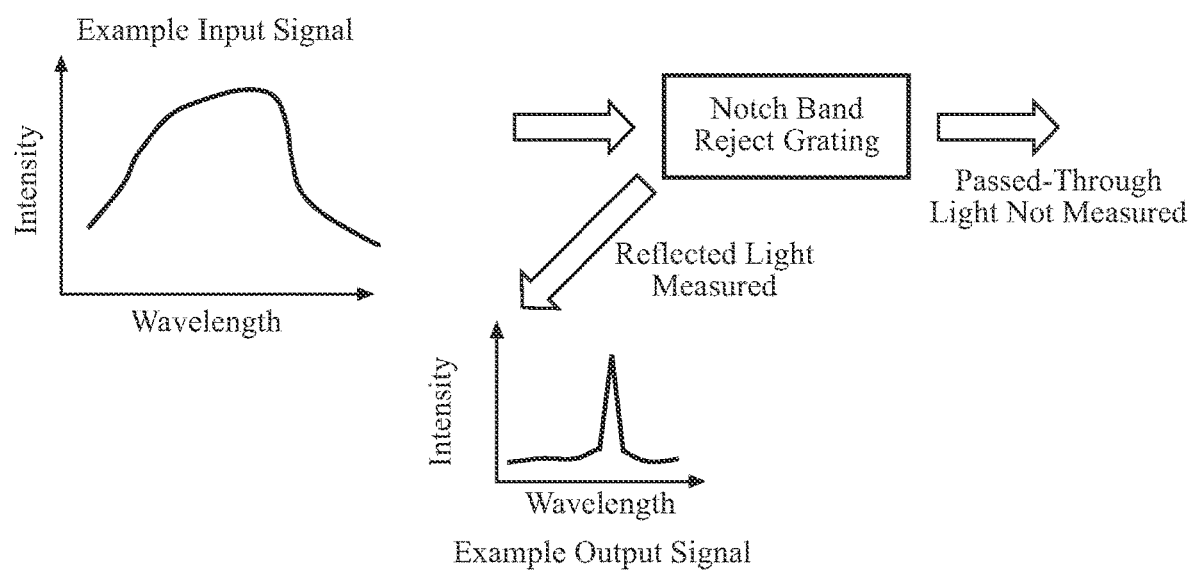
FIG. 11D is an example of an arrangement of a notch band pass grating, a light source, and a detector.

Referring to FIG. 11D, the optical grating(s) 16 can be notch band reject grating(s). The light source(s) 18 can emit an example input signal (e.g., emit light toward the notch band reject grating(s)). The notch band reject grating(s) can be configured to reflect one or a small subset of wavelengths of light and allow the remaining wavelengths to pass through the grating(s). The detector(s) 20 can be positioned on the same side of the grating(s) as the light source(s) 18. The detector(s) 20 can be configured to capture an output signal (light reflected by the grating(s)). As shown in FIG. 11D, only the small segment of light that was reflected appears in the example output signal, which is evident by the spike in the example output signal. In these arrangements, the passed-through light may not be measured.

The optical grating(s) 16 can be used to determine a temperature at or near the first side 12 and/or the second side 14 through detection of the wavelength(s) of light after it has interacted with the optical grating(s) 16. As used herein, the term "near" means within a distance from the surface of the window, such as about 12 inches or less, about 11 inches or less, about 10 inches or less, about 9 inches or less, about 8 inches or less, about 7 inches or less, about 6 inches or less, about 5 inches or less, about 4 inches or less, about 3 inches or less, about 2 inches or less, about 1 inch or less, about 0.75 inches or less, about 0.5 inches or less, or about 0.25 or less. In order to determine the temperature, the system 100 can compare information about the light emitted by the light source(s) 18 and/or the wavelength(s) detected by the detector(s) 20 to the wavelength-temperature dependence data 26, as will be discussed further below with reference to FIG. 3.

With reference again to FIG. 1, the system 100 can include one or more power source(s) 22, as noted above. The power source(s) 22 can be any power source capable of and/or configured to power the system 100 and the elements thereof, including the light source(s) 18, the detector(s) 20, the data store(s) 24, the processor(s) 28, the input interface(s) 32, the output interface(s) 34, and/or the user interface element(s) 36. For example, the power source(s) 22 can include one or more alternating current or direct current sources such as one or more batteries, one or more fuel cells, one or more generators, one or more alternators, one or more solar cells, and combinations thereof.

The system 100 can include one or more data stores 24, as noted above. The data store(s) 24 can include volatile and/or non-volatile memory. Examples of suitable data stores include RAM (Random Access memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 24 can be a component of the processor(s) 28, or the data store(s) 24 can be operatively connected to the processor(s) 28 for use thereby. In some arrangements, the light source data 25 and/or the wavelength-temperature dependence data 26 can be stored in the data store(s) 24.

As noted above, the system 100 can include one or more processors 28. As used herein, the term "processor" can mean any component or group of components that are configured to execute any of the processes described herein or any form of instructions to carry out such processes or cause such processes to be performed. The processor(s) 28 can be implemented with one or more general-purpose processor(s) and/or one or more special-purpose processor(s). Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 28 can include at least one hardware circuit (e.g., an integrated circuit) configured to carry out instructions contained in program code. In arrangements in which there is a plurality of processors, the processors can work independently from each other or one or more processors can work in combination with each other.

The processor(s) 28 can be configured to receive and/or access data from the data store(s) 24. For example, the processor(s) 28 can be configured to receive and/or access the light source data 25 and/or the wavelength-temperature dependence data 26 from the data store(s) 24. In some arrangements, the light source data 25 and/or the wavelength-temperature dependence data 26 can be stored in the processor(s) 28. The light source data 25 and/or the wavelength-temperature dependence data 26 can be stored in the data store(s) 24 and/or the processor(s) 28 in any suitable form. For example, the light source data 25 and/or the wavelength-temperature dependence data 26 can be in the form of a look-up table or a database.

As noted above, the system 100 can include one or more modules, at least some of which will be described herein. The modules can be implemented as computer readable program code that, when executed by a processor, implement one or more of the various processes described herein. One or more of the modules can be a component of the processor(s) 28, or one or more of the modules can be executed on and/or distributed among other processing systems to which the processor(s) 28 is operatively connected. The modules can include instructions (e.g., program logic) executable by one or more processor(s) 28. Additionally or alternatively, the data store(s) 24 may contain such instructions. In one or more arrangements, one or more of the modules described herein can include artificial or computational intelligence elements, e.g., neural network, fuzzy logic or other machine learning algorithms.

As a part of the modules, the system 100 can include a temperature determination module 30. The temperature determination module 30 can be configured to determine the temperature at or near the first side 12 and/or the second side 14 of the window. The temperature determination module 30 can be configured to determine the temperature in any suitable manner.

In some arrangements, the temperature determination module 30 can be configured to analyze data and/or information acquired by the detector(s) 20. For example, the temperature determination module 30 can receive the wavelength(s) of the light after it has interacted with the optical grating(s) 16. The temperature determination module 30 can compare the detected wavelength(s) to the wavelength-temperature dependence data 26 and/or the light source data 25. In some arrangements, the detector(s) 20 can detect a specific wavelength of light or a set of wavelengths of light after it has passed through the optical grating(s). In other arrangements, the detector(s) 20 can detect a specific wavelength of light or a set of wavelengths of light reflected by the optical grating(s). In some arrangements, the specific wavelength of light or the set of wavelengths of light can correlate to a peak in the transmissive spectra of the light. With reference now to FIG. 3, the detected peak can be directly related to the temperature at or near the optical grating(s) 16. This relationship is shown in the wavelength-temperature dependence graph 300 of FIG. 3, which shows a sample of wavelength-temperature dependence data 26. As indicated in the wavelength-temperature dependence data 26, the wavelength(s) can change based on the thermal expansion or thermal contraction of the optical grating(s) 16. The optical grating(s) 16 can expand or contract due to changes in temperature. Through detection of the peak, the temperature at or near the optical grating(s) 16 may be determined using this graph by comparing the wavelength(s) at the peak to the wavelength-temperature dependence data 26.

In some arrangements, the temperature determination module 30 can be configured to analyze changes in one or more characteristics of the light after it has interacted with the optical grating(s) 16 in order to determine the temperature. In some arrangements, the system 100 can include light source data 25, which includes characteristics of the light as it is emitted by the light source(s) 18, such as the wavelength(s) of the emitted light. Using the light source data 25, and by detecting the wavelength(s) of the light after it has interacted with the optical grating(s) 16, the temperature determination module 30 may be configured to determine a change in the wavelength of the light. The change in the wavelength(s) may correspond to the temperature at or near the optical grating(s) 16. As the temperature changes, the transmissive wavelength spectra changes. In some arrangements, an increase in the wavelength(s) may correspond to an increase in the temperature at or near the surface of the window 10. Similarly, a decrease in the wavelength(s) may correspond to a decrease in the temperature at or near the surface of the window 10. The light source data 25 can also be used to calibrate one or more components of the system 100, for example, the detector(s) 20.

In some arrangements, the light source data 25 can be determined in real-time. Thus, in addition to emitting light at the optical grating(s) 16, the light source(s) 18 can emit light directly at the detector(s) 20. In this case, the detector(s) 20 can determine the optical characteristics of the light without interacting with the optical grating(s) 16. In this way, the light can serve as a reference signal. The temperature determination module 30 can be configured to analyze the differences between the reference signal and the characteristics of the light after it has interacted with the optical grating(s) 16. For example, the temperature determination module 30 can be configured to identify changes in wavelength(s) between the reference signal and the characteristics of the light after it has interacted with the optical grating(s) 16. As another example, the temperature determination module 30 can be configured to identify the absence of one or more wavelengths in the light after it has interacted with the optical grating(s) 16 relative to the reference signal.

Moreover, in some arrangements, when the broadband light from the light source(s) 18 is emitted toward the optical grating(s) 16, the optical grating(s) 16 may carry out selective reflection of the light and then reflect a central wavelength and core refractive rate phase modulation that matches a narrow band of light. In the case where the temperature changes, the wavelength also changes and the narrow band light of reflection enters fiber grating decoder solution by an optical splitter to calculate the variable quantity of the wavelength of the reflected light. Therefore, the wavelength-temperature dependence data 26 can be used to determine the corresponding temperature.

Once a temperature at or near the surface of the window 10 has been detected, one or more components of the system 100 can be configured to display the temperature to a person near the window 10. Referring back to FIG. 1, the system 100 can include one or more input interfaces 32. The term "input interface," as used herein, includes any device, component, system, element, or arrangement or groups thereof that enable information and/or data to be entered into a machine. The input interface(s) 32 can be any suitable input interface, including a keypad, display, touch screen, capacitive touch screen, multi-touch screen, button, joystick, mouse, trackball, microphone, proximity sensor, and/or any combination thereof. The input interface(s) 32 can be configured to receive an input. The input can be manually or automatically configured to cause the temperature determined by the system 100 to be displayed.

As noted above, the system 100 can include one or more output interfaces 34. The term "output interface," as used herein, includes any device, component, system, element, or arrangement or groups thereof that enable information and/or data to be presented. The output interface(s) 34 can be any suitable output interface, including a display, touch screen, multi-touch screen, an earphone, a speaker, Bluetooth signal, and/or any combination thereof. Some components of the system 100 may serve as both a component of the input interface(s) 32 and a component of the output interface(s) 34. In some arrangements, the output interface(s) 34 can display or transmit the temperature determined by the system 100.

The system 100 can also include one or more user interface element(s) 36, as noted above. The user interface element(s) 36 can be any suitable user interface element, including a switch, a button, a dial, a lever, a knob, a key, a selector, an actuator, a touch screen and/or a multi-touch screen. In some arrangements, the user interface element(s) 36 can be graphical user interface elements. The user interface element(s) 36 can be one or more components of the input interface(s) 32 and/or the output interface(s) 34. For example, the user interface element(s) 36 can be the input interface(s) 32. In some arrangements, the input interface(s) 32, the output interface(s) 34, and the user interface element(s) 36 can all be components of a display. For example, the input interface(s) 32, the output interface(s) 34, and the user interface element(s) 36 can be components of a dual-sided display, as will be further described below with reference to FIGS. 7-10.

Figure 4:
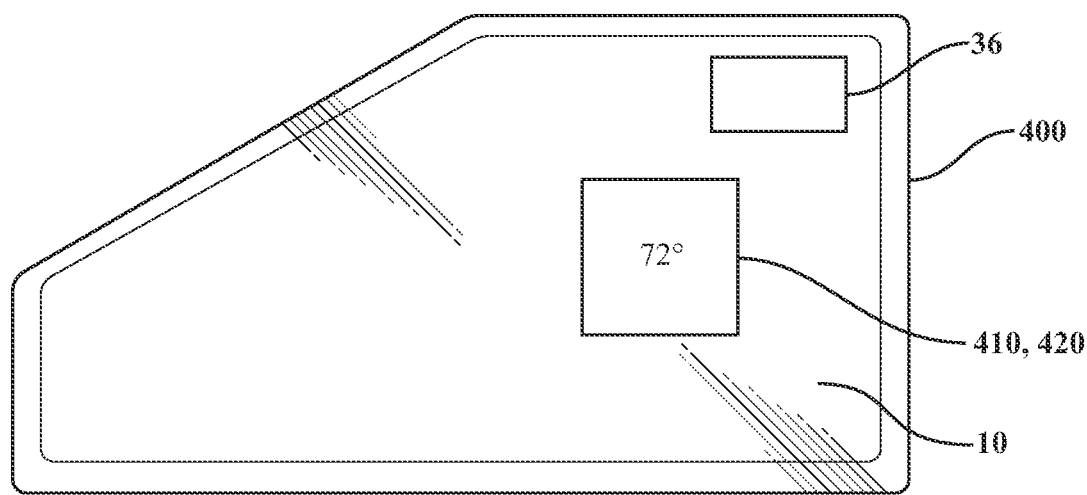
FIG. 4 is an example of a vehicle including the window-based temperature determination system.
Figure 5:
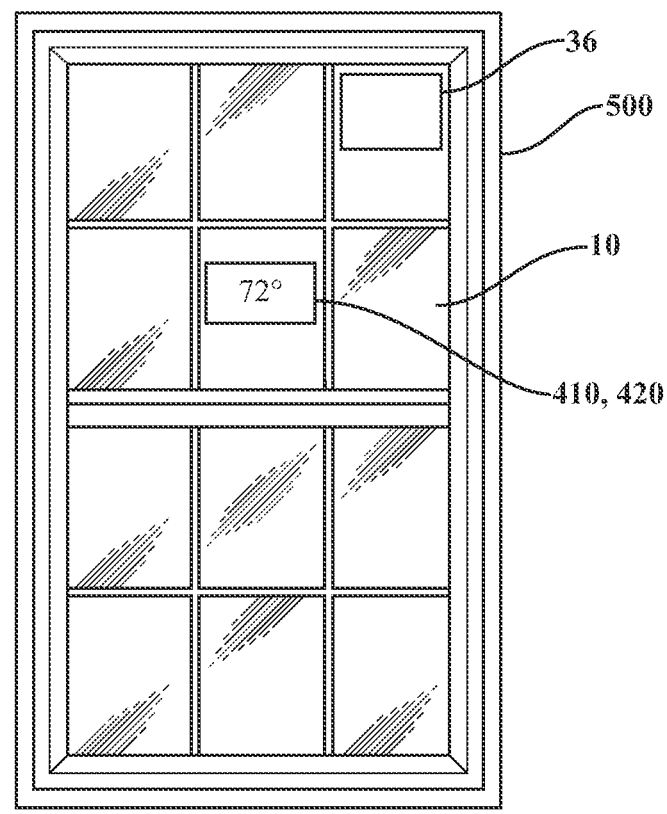
FIG. 5 is an example of a building including the window-based temperature determination system.

With reference now to FIGS. 4 and 5, the system 100 can be a part of a structure. As shown in FIG. 4, the structure can be a vehicle 400, and the system 100 can include a window 10 of the vehicle 400. As shown in FIG. 5, the structure can be a building 500, and the system 100 can include a window 10 of the building 500.

In some arrangements, the window 10 can include a display 410. In some arrangements, at least a portion of the window 10 can include the display 410. In other arrangements, the entire window 10 can be the display 410. The display 410 can be part of the input interface(s) 32 and/or the output interface(s) 34 of the system 100. The display 410 can be configured to display information, data, images, and/or video to a person near the window 10. For example, the display 410 can be configured to display the temperature determined by the system 100. The temperature can be displayed visually, using images and/or text, and/or the temperature can be displayed audibly through sounds. The displayed temperature could be part of a larger user content scene (e.g., similar to a web page).

In some arrangements, the display 410 can be a dual-sided transparent display 420. The dual-sided transparent display 420 can be configured to display first visual information on the first side 12 of the window 10 and to display second visual information on the second side 14 of the window 10. In some arrangements, the first visual information can be the temperature at or near the first side 12 of the window 10, and the second visual information can be the temperature at or near the second side 14 of the window 10. In other arrangements, the first visual information can be the temperature at or near the second side 14 of the window 10, and the second visual information can be the temperature at or near the first side 12 of the window 10. In some arrangements, the first visual information is not visible on the second side 14 of the window. Similarly, in some arrangements, the second visual information is not visible on the first side 12 of the window 10. Various different embodiments of the dual-sided transparent display 420 will be described further below with reference to FIGS. 7-10.

The first visual information and/or the second visual information can be displayed at any suitable time. For instance, the first visual information and/or the second visual information can be displayed continuously, periodically, irregularly, or even randomly. In some arrangements, the first visual information and/or the second visual information can be displayed in response to a user command (e.g., such as provided on the input interface(s) 32). As an example, if a user taps or otherwise engages the first side 12 of the window 10 (or a user interface element on the first side 12 of the window or otherwise on that side of the structure), then the temperature on the first side 12 of the window 10 (or, alternatively, the second side 14 of the window 10) can be determined and displayed. Likewise, if a user taps or otherwise engages the second side 14 of the window 10 (or a user interface element on the second side 14 of the window or otherwise on that side of the structure), then the temperature on the second side 14 of the window 10 (or, alternatively, the first side 12 of the window 10) can be determined and displayed. Thus, a user input can cause the respective light source(s) to be activated.

Now that the various potential systems, devices, elements and/or components of the system 100 have been described, various methods will now be described. Various possible steps of such methods will now be described. The methods described may be applicable to the arrangements described above in relation to FIGS. 1-5, but it is understood that the methods can be carried out with other suitable systems and arrangements. Moreover, the methods may include other blocks that are not shown here, and in fact, the methods are not limited to including every block shown. The blocks that are illustrated here as part of the methods are not limited to the particular chronological order. Indeed, some of the blocks may be performed in a different order than what is shown and/or at least some of the blocks shown can occur simultaneously.

Figure 6:
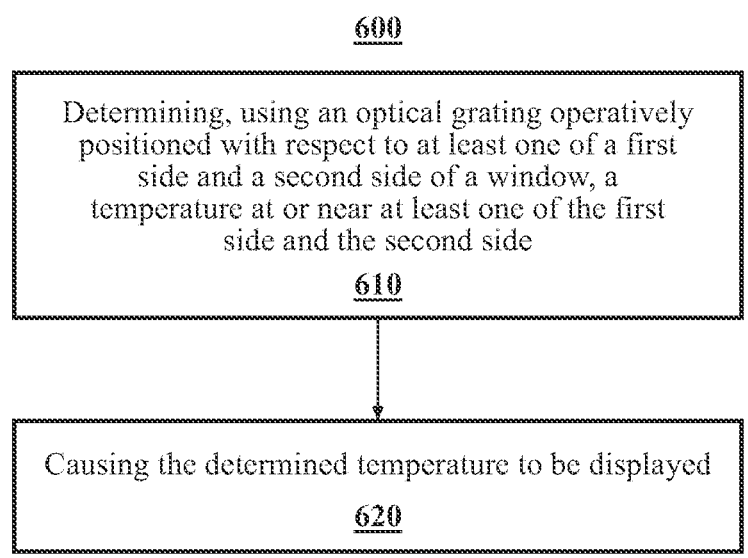
FIG. 6 is an example of a method of determining a temperature on at least one side of the window.

With reference now to FIG. 6, an example of a method 600 is shown. At block 610, a temperature can be determined at or near at least one of a first side 12 and a second side 14 of a window 10. For example, using optical grating(s) 16 operatively positioned with respect to at least one of the first side 12 and the second side 14 of the window 10, the temperature can be determined by detecting the wavelength of light after it has passed through the optical grating(s) 16 and comparing the detected wavelength to wavelength-temperature dependence data 26.

The method 600 can continue to block 620. At block 620, the determined temperature can be caused to be displayed. The causing can be performed by the processor(s) 28 and/or the temperature determination module 30. The determined temperature can be displayed through the output interface(s) 34. The method can return to block 610 or proceed to some other block.

Referring now to FIGS. 7-10, three embodiments of the dual-sided transparent display 420 are shown. In some arrangements, the dual-sided transparent display 420 is a dual-sided transparent display panel 420. The embodiments described below overcome three significant shortcomings of conventional dual-sided display panels, which are described below.

First, in some implementations, a user looking at one side of the display, in addition to seeing an image intended for him or her, can also see an image intended for a user on the opposite side of the display, and the two images may overlap and interfere with each other, impairing the clarity of the intended image. This is sometimes referred to as the "occlusion" problem. Second, in some implementations, a user looking at one side of the display, in addition to seeing an image intended for him or her, can also see a backward (horizontally flipped) image intended for a user on the opposite side of the display, causing distraction or confusion, whether the reversed image overlaps with the intended image or not. This is sometimes referred to as the "obversion" problem. Third, in some implementations, light is intentionally blocked between the two sides of the display to avoid occlusion and obversion, resulting in a dark region delineating an image intended for a user on either side of the display. This is sometimes referred to as the "obstruction" problem.

Various embodiments described herein can provide a true dual-sided transparent display panel. One principle underlying the embodiments described herein is that light propagating through a waveguide becomes visible only when it is scattered (e.g., refracted). This principle is employed in conjunction with an edge-lighted design to provide a dual-sided transparent display panel that displays images independently on both sides of the display panel without occlusion, obversion, or obstruction. That is, a user on one side of the transparent display can view an image intended for him or her at the same time another user on the opposite side of the transparent display views an image intended for that other user, and neither user sees the image (reversed or otherwise) intended for the user on the opposite side. Instead, the portions of the display panel not containing an image intended for a user looking at the applicable side of the display panel appear transparent to that user, and the same applies to a user looking at the opposite side of the display panel.

Figure 7:
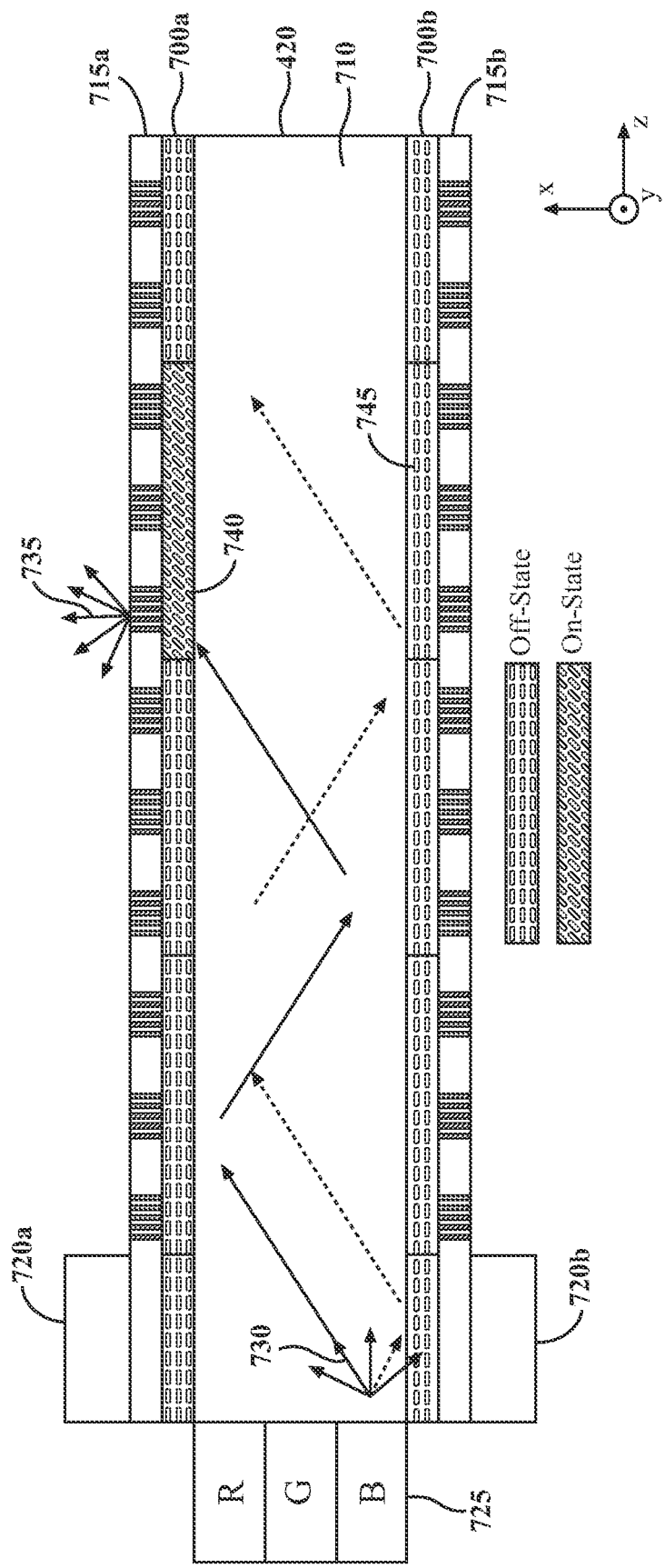
FIG. 7 is an example of a first embodiment of a dual-sided transparent display that can be used in connection with the window-based temperature determination system.

FIG. 7 is a cross-sectional diagram a first embodiment of a dual-sided transparent display panel 420. This embodiment includes a first layer of electro-optic material 700a and a second layer of electro-optic material 700b, each of which has an inner surface (the surface closest to the axis of symmetry of the waveguide 710) and an outer surface (the surface farthest from the axis of symmetry just mentioned). As shown in FIG. 7, waveguide 710 is disposed between the inner surface of the first layer of electro-optic material 700a and the inner surface of the second layer of electro-optic material 700b. In some embodiments, waveguide 710 is made of glass.

Dual-sided transparent display panel 420 also includes a first grating coating 715a adjacent to the outer surface of the first layer of electro-optic material 700a and a second grating coating 715b adjacent to the outer surface of the second layer of electro-optic material 700b. In one embodiment, the first and second grating coatings (715a and 715b) are periodic grating coatings that include alternating diffusive and plain-glass regions.

Dual-sided transparent display panel 420 also includes light sources 725 along an edge of waveguide 710 that is perpendicular to the inner and outer surfaces of the first and second layers of electro-optic material (700a and 700b). In this embodiment, the light sources include red, green, and blue light sources in accordance with the RGB standard. In some embodiments, the light sources 725 are lasers. In other embodiments, the light sources 725 are light-emitting diodes (LEDs). In one embodiment, the LEDs are Micro-LEDs. In the coordinate system shown in FIG. 7, the light sources 725 are disposed along an edge of waveguide 710 that runs in the y direction (into and out of the page) and faces the negative z direction. In the embodiment shown in FIG. 7, dual-sided transparent display panel 420 is thus edge-lit by light sources 725.

As diagramed in FIG. 7, light emitted from light sources 725 propagates along waveguide 710 in the z direction. In this embodiment, the first layer of electro-optic material 700a and the second layer of electro-optic material 700b can be, for example, an active liquid-crystal matrix or, in a different embodiment, a passive liquid-crystal matrix. In one embodiment, the first and second layers of electro-optic material (700a and 700b) are thin-film-transistor (TFT) liquid-crystal matrices.

As those skilled in the art are aware, a liquid-crystal matrix is a special type of material that has two different refractive indices, $n_e$ (extraordinary) and $n_o$ (ordinary), depending on the electro-optical state of the material. In response to electrical control (e.g., a voltage) from driver circuitry (not shown in FIG. 7), the molecules of a liquid-crystal matrix can be caused to orient themselves in an "off" state or an "on" state. In FIG. 7, the vertical lines in first layer of electro-optic material 700a and second layer of electro-optic material 700b delineate the boundaries of rows or columns of pixels (in the y direction) in dual-sided transparent display panel 420.

Refer to the legend in FIG. 7 for the "on" and "off" states. Pixels with molecules oriented in the "off" (reflective) state 745 cause light such as the blue light 730 to be totally internally reflected within waveguide 710. The concept of total internal reflection (TIR) is well known in the waveguide-related art. As shown in FIG. 7, the oblong-shaped molecules oriented in the "off" state (745) are oriented substantially parallel to the z-axis (parallel to the direction in which light propagates within waveguide 710). Thus, a viewer looking at one of the sides of the dual-sided transparent display panel 420 in the positive or negative x direction would not see the blue light 730 at those pixel positions. A viewer looking at the waveguide cannot see the light traveling in the waveguide, but the liquid crystal can change the refractive index and thus help commute scattering. Pixels with molecules oriented in the "on" (transmissive) state 740, on the other hand, are oriented at an angle relative to the z-axis, permitting light to exit waveguide 710, the blue light 730 mentioned earlier being diffused by first grating coating 715a to produce diffused and emitted blue light 735 that is visible to a user looking at dual-sided transparent display panel 420 in the negative x direction. As those skilled in the art will recognize, the individual pixels can be controlled (i.e., placed in the "on" or "off" state) using the driver circuitry mentioned above. Importantly, this can be done independently for the two sides of dual-sided transparent display panel 420 (the side facing the positive x direction and the side facing the negative x direction) to permit different images to be displayed on the two opposite sides of dual-sided transparent display panel 420 simultaneously.

As shown in FIG. 7, dual-sided transparent display panel 420 also includes first light-blocking element 720a and second light-blocking element 720b. These light-blocking elements prevent light from leaking in the x direction from a predetermined portion (e.g., a rectangular strip) of dual-sided transparent display panel 420 adjacent to the edge of waveguide 710 (the perpendicular edge mentioned above) along which light sources 725 edge-light the display panel. In other words, the light-blocking elements 720a and 720b block light that is not totally internally reflected near the edge of the waveguide 710 closest to the light sources 725. In variations of the first embodiment (the embodiment shown in FIG. 7), a different type of electro-optic material other than a liquid-crystal matrix can be used.

Figure 8A:
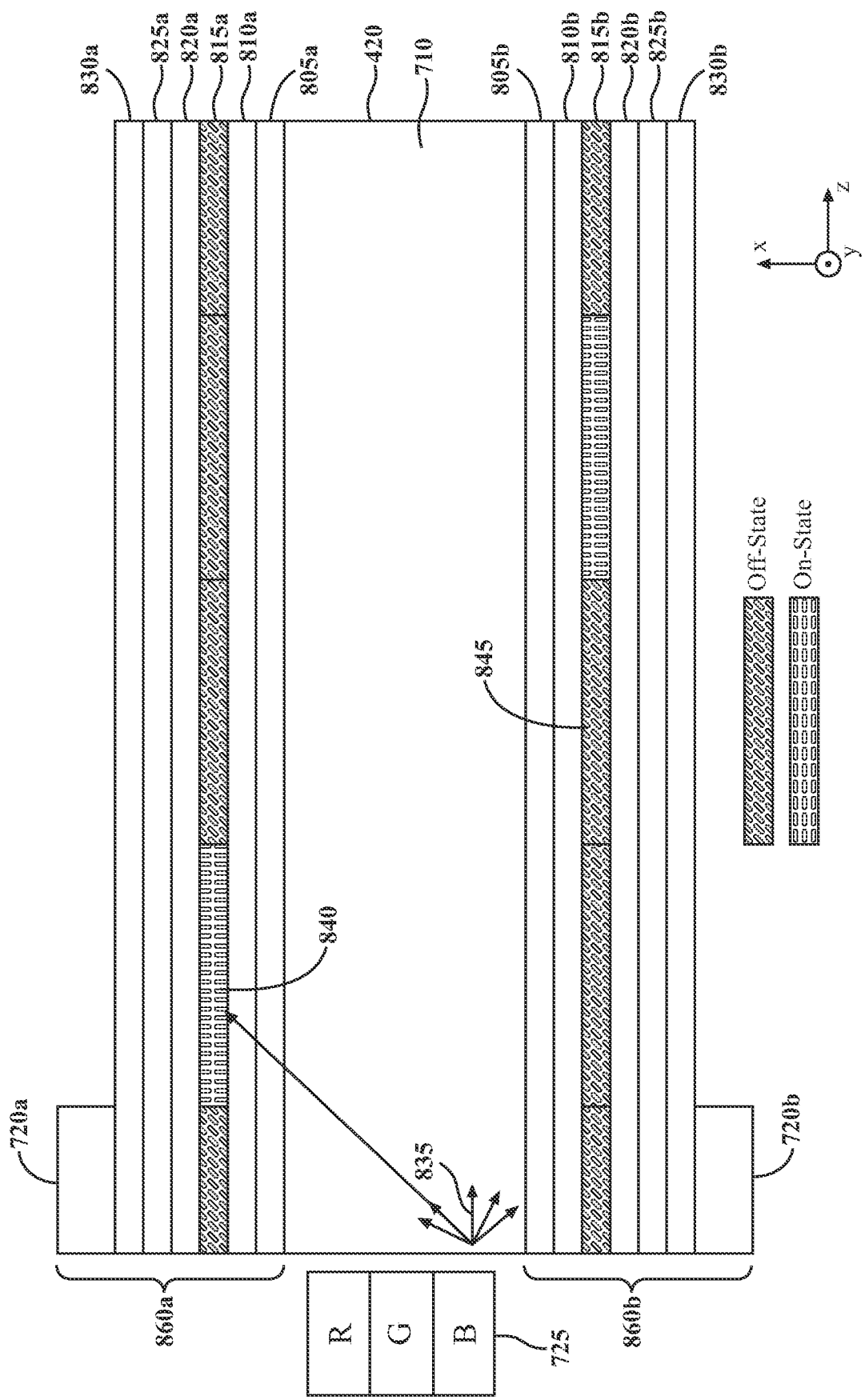
FIGS. 8A and 8B are an example of a second embodiment of a dual-sided transparent display that can be used in connection with the window-based temperature determination system.

FIG. 8A is a cross-sectional diagram of a second embodiment of a dual-sided transparent display panel 420 in an illustrative molecular configuration of the liquid-crystal matrices. In this embodiment, the first and second grating coatings 715a and 715b in the embodiment of FIG. 7 are omitted, and other layers are added to each side of the overall display panel. In this embodiment, the liquid-crystal matrices themselves are capable of scattering/diffusing light, eliminating the need for the grating coatings. The two sides of dual-sided transparent display panel 420 may be thought of as separate panel subassemblies. A first panel subassembly 860a of dual-sided transparent display panel 420 includes a plurality of adjacent layers. Those layers, moving from the innermost layer to the outermost layer (relative to the axis of symmetry of waveguide 710) include a first electrode layer 805a, a first polyimide layer 810a, a liquid-crystal matrix 815a, a second polyimide layer 820a, a second electrode layer 825a, and a glass layer 830a. The polyimide layers (810a and 820a) are used to place the liquid-crystal molecules in the desired orientation, when they are in their passive (default) state. The specific orientations of the molecules are discussed in greater detail below. In some embodiments, the electrode layers (805a, 825a) include Indium Tin Oxide (ITO).

A second panel subassembly 860b of dual-sided transparent display panel 420 includes a plurality of adjacent layers that correspond to those in the first panel subassembly 860a. Those layers, moving from the innermost layer to the outermost layer (relative to the axis of symmetry of waveguide 710), include a first electrode layer 805b, a first polyimide layer 810b; a liquid-crystal matrix 815b; a second polyimide layer 820b; a second electrode layer 825b, and a glass layer 830b. As mentioned above, in some embodiments, the electrode layers (805b, 825b) include Indium Tin Oxide (ITO).

In this embodiment, a waveguide 710 is disposed between the inner surface of the first electrode layer 805a of the first panel subassembly 860a and the inner surface of the first electrode layer 805b of the second panel subassembly 860b. In some embodiments, waveguide 710 is made of glass, as in the embodiment shown in FIG. 7.

Dual-sided transparent display panel 420 also includes light sources 725 along an edge of waveguide 710 that is perpendicular to the inner surface of the first electrode layer 805a of the first panel subassembly 860a and the inner surface of the first electrode layer 805b of the second panel subassembly 860b. In this embodiment, the light sources include RGB light sources. In some embodiments, the light sources 725 are lasers. In other embodiments, the light sources 725 are light-emitting diodes (LEDs). In the coordinate system shown in FIG. 8A, the light sources 725 are disposed along an edge of waveguide 710 that runs in the y direction (into and out of the page) and faces the negative z direction. In the embodiment shown in FIG. 8A, dual-sided transparent display panel 420 is thus edge-lighted by light sources 725.

In some embodiments, the liquid-crystal matrix in each of the panel subassemblies (860a and 860b) includes nematic liquid crystals. Refer to the legend for the "on" and "off"

states in FIG. 8A. As depicted in FIG. 8A, the oblong-shaped molecules making up the nematic liquid crystals can be oriented at an angle (less than 90 degrees) relative to the positive z-axis, when in the passive or "off" state (see molecules oriented in the "off" state 845 in FIG. 8A). When the oblong-shaped molecules are in the "on" state, they are aligned approximately perpendicularly to waveguide 710 (see molecules oriented in the "on" state 840 in FIG. 8A). In the illustrative configuration of the molecules depicted in FIG. 8A, blue light 835 reaches a pixel for which the molecules are in the "on" state (840), which permits the blue light 835 to exit the first panel subassembly 860a in the positive x direction, making it visible to a user gazing toward dual-sided transparent display panel 420 in the negative x direction.

As shown in FIG. 8A, dual-sided transparent display panel 420 also includes first light-blocking element 720a and second light-blocking element 720b. These light-blocking elements prevent light from leaking in the x direction from a predetermined portion (e.g., a rectangular strip) of dual-sided transparent display panel 420 adjacent to the edge of waveguide 710 that is perpendicular to the inner surface of the first electrode layer 805a of the first panel subassembly 860a and the inner surface of the first electrode layer 805b of the second panel subassembly 860b—the edge of waveguide 710 along which light sources 725 edge-light the display panel. In other words, the light-blocking elements 720a and 720b block light that is not totally internally reflected near the edge of the waveguide 710 closest to the light sources 725.

Figure 8B:
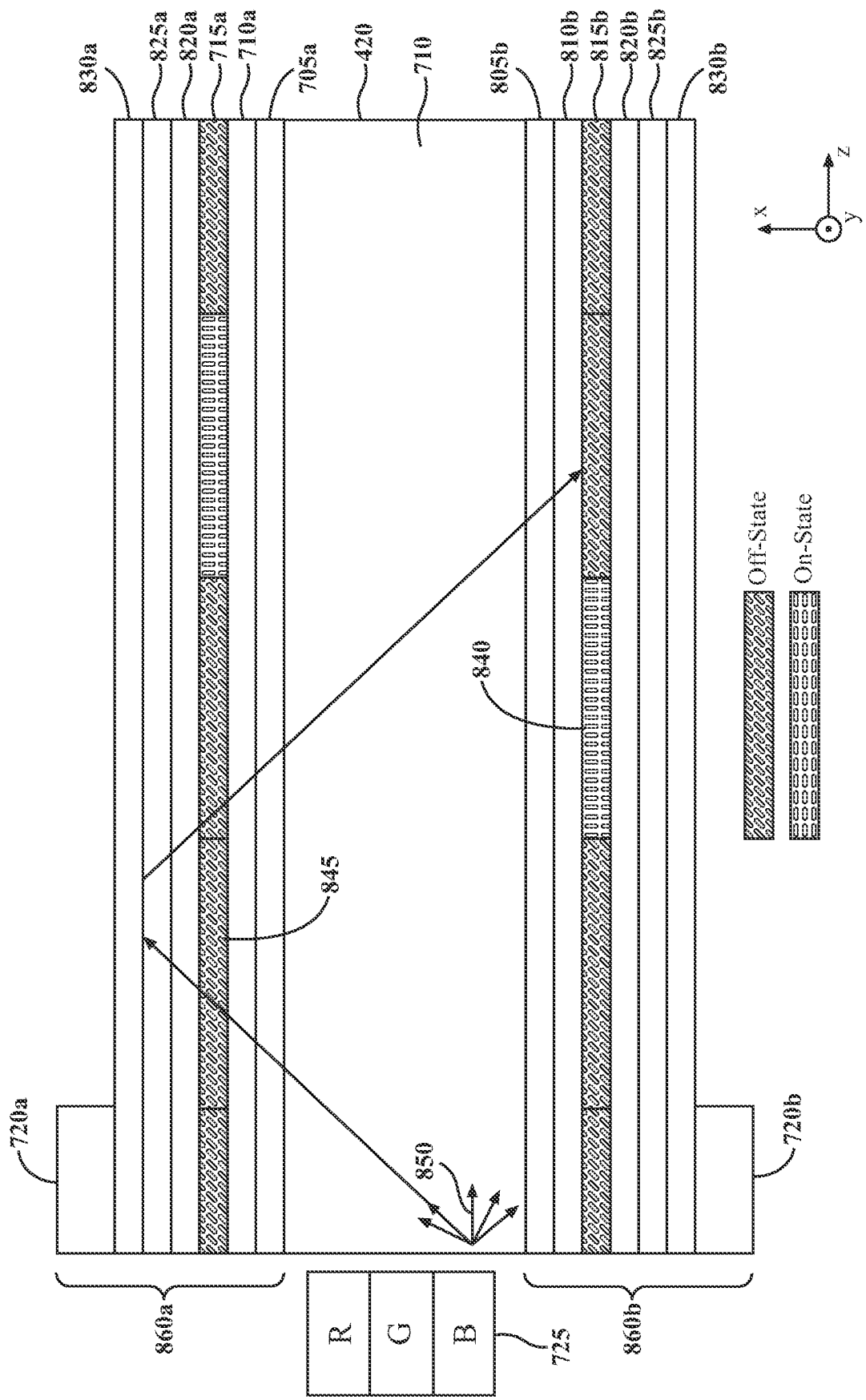

FIG. 8B is a cross-sectional diagram of a second embodiment of a dual-sided transparent display panel 420 in another illustrative molecular configuration of the liquid-crystal matrices. Refer to the legend for the "on" and "off" states in FIG. 8B. In this example, green light 850 encounters molecules in the liquid-crystal matrix 815a of the first panel subassembly 860a that are oriented in the "off" state (see molecules oriented in "off" state 845 in FIG. 8B). The orientation of those molecules (845) permits the green light 850 to propagate beyond liquid-crystal matrix 815a but causes the green light 850 to nevertheless be reflected within first panel subassembly 860a as if the dimensions of waveguide 710 were effectively expanded to encompass, e.g., the glass layer 830a of first panel subassembly 860a, as depicted in FIG. 8B. Thus, the molecules in a given panel subassembly (860a or 860b) that are oriented in the "off" state cause light from light sources 725 to be reflected by that panel subassembly toward the waveguide 710 instead of exiting that panel subassembly.

Before discussing a third embodiment of a dual-sided transparent display panel shown in FIG. 10, FIGS. 9A and 9B will be discussed to introduce some of the important principles underlying the embodiment in FIG. 10. FIG. 9A is a diagram of beam splitting using circular polarization when the molecules of a liquid-crystal substance are oriented in an "off" state, in connection with a third embodiment of a dual-sided transparent display panel. In FIG. 9A, light with two opposite circular polarizations, counterclockwise-polarized light 920 and clockwise-polarized light 925, enters a nematic liquid-crystal substance 905. In FIG. 9A, the molecules 910 are oriented in the "off" state. This causes the counterclockwise-polarized light 920 to be diverted in the negative x direction (directed light 930) and the clockwise-polarized light 925 to be diverted in the opposite (positive x) direction (directed light 935). With the molecules in this "off" configuration and the incoming light being polarized in opposite senses (clockwise and counterclockwise or right-handed and left-handed, respectively), the nematic liquid-crystal substance 905 effectively acts as a beam splitter to direct light toward the separate sides of a dual-sided transparent display panel, depending on how the incoming light is polarized. In other words, an arrangement such as that shown in FIG. 9A exploits the chirality (or handedness) of the liquid-crystal molecules' effect on circularly polarized light, when the molecules are oriented in the "off" state.

FIG. 9B is a diagram of light passing through a liquid-crystal substance when the molecules are in an orientation corresponding to an "on" state, in connection with a third embodiment of a dual-sided transparent display panel. As shown in FIG. 9B, entering light 940 passes through nematic liquid-crystal substance 905 (see exiting light 945 in FIG. 9B) without being diverted by molecules 915 that are oriented in the "on" state. Such light will not be visible to a user looking at either side of the dual-sided transparent display panel.

FIG. 10 is a cross-sectional diagram of a third embodiment of a dual-sided transparent display panel 420. A first panel subassembly 1035a of dual-sided transparent display panel 420 includes a plurality of adjacent layers. Those layers, moving from the innermost layer to the outermost layer (relative to the axis of symmetry of a nematic liquid-crystal layer 1020 that acts as a waveguide) include a polyimide alignment layer 1005a, an electrode layer 1010a, and a glass layer 1015a.

A second panel subassembly 1035b of dual-sided transparent display panel 420 includes a plurality of layers that correspond to those in first panel subassembly 1035a. Those layers, moving from the innermost layer to the outermost layer (relative to the axis of symmetry of nematic liquid-crystal layer 1020) include a polyimide alignment layer 1005b, an electrode layer 1010b, and a glass layer 1015b. In some embodiments, the electrode layers (1010a and 1010b) in the two panel subassemblies include Indium Tin Oxide (ITO).

As shown in FIG. 9, nematic liquid-crystal layer 1020 is disposed between the inner surface of the polyimide alignment layer 1005a of the first panel subassembly 1035a and the inner surface of the polyimide alignment layer 1005b of the second panel subassembly 1035b. In a different embodiment, cholesteric liquid crystals are used instead of nematic liquid crystals. As discussed above, this layer acts as a waveguide with reorientable molecules within it (refer to the discussion of FIGS. 9A and 9B above) that direct, toward the glass layer 1015a of the first panel subassembly 1035a, light 1025 from one or more light sources that is circularly polarized in a first sense and that direct, toward the glass layer 1015b of the second panel subassembly, light 1025 that is circularly polarized in a second sense that is opposite the first sense. As discussed above, the two opposite senses for circular polarization are clockwise and counterclockwise (also sometimes called right-handed and left-handed circular polarization, respectively). Though not shown in FIG. 10, the light sources for edge-lighting of the dual-sided transparent display panel can be similar, in this embodiment, to those discussed above in connection with FIGS. 7, 8A, and 8B (the first and second embodiments). In some variations of the embodiment shown in FIG. 10, a different type of liquid-crystal layer other than a nematic liquid-crystal layer can be employed.

In the embodiment shown in FIG. 10, the nematic liquid-crystal layer 1020 acts as a waveguide containing reorientable molecules that, in the "off" state, can divert light to a specific one of the two sides of a dual-sided transparent display panel, depending on the sense of the entering circularly polarized light. The driver circuitry, in this embodiment, can control both the state ("on" or "off") of the molecules associated with individual pixels and the polarization of the light emitted at the edge of nematic liquid-crystal layer 1020 from one or more light sources, such as the light sources 725 shown in FIGS. 7, 8A, and 8B. In some embodiments, a single light emitter is used, and the polarization is switched as needed over time to support a dual-sided transparent display panel, but in other embodiments, two emitters (one for each side of the dual-sided transparent display panel) are used. Some possible methods to switch polarizations could include photo elastic modulators, variable retarders (also known as variable wave plates), or fast-switching wave plates. In some embodiments, use can be made of diodes that emit circular polarizations from the light source itself.

In the various embodiments discussed above, the refresh cycle of a typical liquid-crystal matrix can be reduced by a factor of three in order to account for the different colors emitted by the light sources 725 to accommodate the sequential color scheme of the display. Mixed colors or multiple colors can be emitted by overlapping the time frames of how long the liquid-crystal matrix is open. One possible order is R, then G, then B. A purple pixel can be created, for example, by mixing red and blue light. Therefore, the length of time the pixel is "scattering light to a viewer/user" will vary the hue of the purple color. To mix red and blue evenly, the activation time should be equal for the two colors. Also, different types of liquid crystals can be used, depending on the particular embodiment, to achieve different effects. Cholesteric liquid crystals can be used to change the refractive index. This abrupt change in refractive index can cause deflection or scattering out of the flat display panel because of its poly-domain structure.

Further, it will be appreciated that the above-described embodiments of the dual-sided transparent display are not the only configurations that can be used. Indeed, additional examples of the dual-sided transparent display can include any of those disclosed in U.S. patent application Ser. No. 16/897,577, which is incorporated herein by reference in its entirety.

It will be appreciated that arrangements described herein can provide numerous benefits, including one or more of the benefits mentioned herein. For example, arrangements described herein can integrate a system for detecting temperature into a window of a structure in a streamlined manner. Arrangements described herein can be implemented without affecting visibility through the window. Arrangements described herein can determine a temperature on each side of the window. Arrangements described herein can enable a person near the window to quickly and conveniently learn the temperatures on each side of the window, for example, the temperature inside the structure and the temperature outside the structure.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the function(s) noted in the block diagrams may occur out of the order noted in the figures. For example, two blocks shown in succession may, in fact, be executed substantially concurrently, or the blocks may sometimes be executed in the reverse order, depending on the functionality involved.

The systems, components, and/or processes described above can be realized in hardware or a combination of hardware and software and can be realized in a centralized fashion in one processing system or in a distructed fashion where different elements are spread across several interconnected processing systems. Any kind of processing system or other apparatus adapted for carrying out the methods described herein is suitable. A typical combination of hardware and software can be a processing system with computer-useable program code that, when being loaded and executed, controls the processing system such that it carries out the methods described herein. The systems, components, and/or processes can also be embedded in a computer-readable storage, such as a computer program product or other data programs storage device, readable by a machine, tangibly embodying a program of instructions executable by the machine to perform methods and processes described herein. These elements can also be embedded in an application product which comprises all the features enabling the implementation of the methods described herein and which, when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein refers to and encompasses any and all possible combinations of one or more of the associated listed items. As an example, the phrase "at least one of A, B, and C" includes A only, B only, C only, or any combination thereof (e.g. AB, AC, BC, or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A window, comprising:
   a first side;
   a second side substantially parallel to the first side;
   a first optical grating operatively positioned on the first side and used to determine a temperature of an external environment of the first side;
   a second optical grating operatively positioned on the second side and used to determine a temperature of an external environment of the second side;

a first light source operatively positioned on the first side and configured to emit light toward the first optical grating;
a first detector operatively positioned to detect one or more wavelengths of the light after it has interacted with the first optical grating;
a second light source operatively positioned on the second side and configured to emit light toward the second optical grating; and
a second detector operatively positioned to detect one or more wavelengths of the light after it has interacted with the second optical grating.

2. The window of claim 1, wherein at least one of the first optical grating and the second optical grating is a Bragg grating.

3. The window of claim 1, wherein the first light source and the first detector are operatively positioned on opposite sides of the first optical grating, and wherein the first detector is configured to detect one or more wavelengths of the light after it has passed through the first optical grating.

4. The window of claim 1, wherein the first light source and the first detector are operatively positioned on the same side of the first optical grating, and wherein the first detector is configured to detect one or more wavelengths of the light after it has been reflected by the first optical grating.

5. The window of claim 1, wherein at least one of the first optical grating and the second optical grating is a notch band reject optical grating.

6. The window of claim 1, wherein at least one of the first optical grating and the second optical grating is a notch band pass optical grating.

7. The window of claim 1, further comprising:
a processor operatively connected to at least one of the first detector and the second detector, wherein the processor is configured to:
determine, using wavelength-temperature dependence data, at least one of the temperature of the external environment of the first side and the temperature of the external environment of the second side based on the detected one or more wavelengths.

8. The window of claim 1, wherein the first light source and the first detector are operatively positioned on opposite sides of the first optical grating, and wherein the second light source and the second detector are operatively positioned on opposite sides of the second optical grating.

9. The window of claim 1, wherein the first light source and the first detector are operatively positioned on the same side of the first optical grating, and wherein the second light source and the second detector are operatively positioned on the same side of the second optical grating.

10. A window system, comprising:
a structure having a window, the window having a first side and a second side substantially parallel to the first side;
an optical grating operatively positioned on one of the first side and the second side, the optical grating being used to determine a temperature of an external environment of the window on the respective one of the first side and the second side;
a light source operatively positioned on one of the first side and the second side, the light source being configured to emit light toward the optical grating in a direction substantially parallel to one of the first side and the second side;
a detector operatively positioned to detect one or more wavelengths of the light after it has interacted with the optical grating; and a processor operatively connected to the optical grating, the processor being configured to:
determine, using wavelength-temperature dependence data, the temperature of the external environment of the window on the respective one of the first side and the second side based on the detected one or more wavelengths.

11. The window system of claim 10, wherein the optical grating is a Bragg grating.

12. The window system of claim 10, wherein the optical grating is a first optical grating operatively positioned on the first side, wherein the first optical grating is used to determine a temperature of an external environment of the window on the first side, and further comprising:
a second optical grating operatively positioned on the second side, wherein the second optical grating is used to determine a temperature of an external environment of the window on the second side.

13. The window system of claim 10, wherein the light source is a first light source operatively positioned on the first side, wherein the optical grating is a first optical grating operatively positioned on the first side, wherein the first light source is configured to emit light toward the first optical grating, and wherein the detector is a first detector operatively positioned to detect the wavelength of the light after it has interacted with the first optical grating, and further comprising:
a second optical grating operatively positioned on the second side, the second optical grating being used to determine a temperature of an external environment of the window on the second side;
a second light source operatively positioned on the second side, wherein the second light source is configured to emit light toward the second optical grating; and
a second detector operatively positioned to detect one or more wavelengths of the light after it has interacted with the second optical grating.

14. The window system of claim 10, wherein the processor is configured to:
determine, using wavelength-temperature dependence data, a temperature of an external environment of the window on the respective one of the first side and the second side based on the detected one or more wavelengths.

15. The window system of claim 10, wherein the structure is one of a vehicle and a building.

16. A method for determining a temperature of an external environment of a window on one of a first side and a second side of the window, the second side being substantially parallel to the first side, and the window including a first optical grating operatively positioned on the first side and used to determine a temperature of an external environment of the first side, a second optical grating operatively positioned on the second side and used to determine a temperature of an external environment of the second side, a first light source operatively positioned on the first side and configured to emit light toward the first optical grating, a first detector operatively positioned to detect one or more wavelengths of the light after it has interacted with the first optical grating, a second light source operatively positioned on the second side and configured to emit light toward the second optical grating, a second detector operatively positioned to detect one or more wavelengths of the light after it has interacted with the second optical grating, the method comprising:

determining, using at least one of the first optical grating and the second optical grating, the temperature of the external environment of the window on one of the first side and the second side.

17. The method of claim 16, wherein the at least one of the first optical grating and the second optical grating is a Bragg grating.

18. The method of claim 16, wherein determining the temperature of the external environment of the window on the first side includes comparing the detected one or more wavelengths of the light after it has interacted with the first optical grating to wavelength-temperature dependence data.

19. The method of claim 16, further including:
causing the determined temperature to be displayed.

20. The method of claim 19, wherein the determined temperature—is displayed on the window.

* * * * *